(12) United States Patent
Vieira Da Silva et al.

(10) Patent No.: US 10,197,725 B2
(45) Date of Patent: Feb. 5, 2019

(54) MULTIMODE OPTICAL FIBER FOR POWER-OVER-FIBER APPLICATIONS WITH SPECIFIC REFRACTION INDEX PROFILE

(71) Applicant: Prysmian S.p.A., Milan (IT)

(72) Inventors: João Carlos Vieira Da Silva, Milan (IT); Evandro Lee Anderson Spìnola De Souza, Milan (IT); Valeria Garcia, Milan (IT); João Batista Rosolem, Campinas (BR); Claudio Floridia, Campinas (BR); Marcos Antonio Brandão Sanches, Campinas (BR)

(73) Assignee: PRYSMIAN S.p.A, Milan (IT)

( * ) Notice: Subject to any disclaimer, the term of this patent is extended or adjusted under 35 U.S.C. 154(b) by 29 days.

(21) Appl. No.: 15/524,526

(22) PCT Filed: Nov. 7, 2014

(86) PCT No.: PCT/EP2014/074106
§ 371 (c)(1),
(2) Date: May 4, 2017

(87) PCT Pub. No.: WO2016/070946
PCT Pub. Date: May 12, 2016

(65) Prior Publication Data
US 2018/0335563 A1 Nov. 22, 2018

(51) Int. Cl.
*G02B 6/028* (2006.01)
*G02B 6/42* (2006.01)

(52) U.S. Cl.
CPC ......... *G02B 6/0288* (2013.01); *G02B 6/4296* (2013.01)

(58) Field of Classification Search
CPC ........ G02B 6/028; G02B 6/0288; G02B 6/42; G02B 6/4296
See application file for complete search history.

(56) References Cited

U.S. PATENT DOCUMENTS 5,115,486 A 5/1992 Bader et al.
8,520,994 B2 * 8/2013 Kim .................. G02B 6/02023
385/124

(Continued)

FOREIGN PATENT DOCUMENTS

EP 1 498 753 A2 1/2005
EP 2 166 386 A1 3/2010

(Continued)

OTHER PUBLICATIONS

International Search Report form the European Patent Office in corresponding International Application No. PCT/EP2014/074106 dated Jul. 7, 2015.

(Continued)

*Primary Examiner* — Andrew Jordan
(74) *Attorney, Agent, or Firm* — Finnegan, Henderson, Farabow, Garrett & Dunner, L.L.P.

(57) ABSTRACT

A multimode optical fiber for continuous transmission of electromagnetic radiation at high power, wherein the fiber defines a fiber axis and includes a core and a cladding surrounding the core, and wherein the multimode optical fiber is a multimode graded-index fiber, the refraction index profile in the fiber essentially following formula (1):

$$n(r) = \begin{cases} n_1\left[1 - 2\left(\frac{r}{a}\right)^g \Delta\right]^{1/2}, & r < a \\ n_2, & r > a \end{cases} \quad (1)$$

$$\Delta = \frac{n_1^2 - n_2^2}{2n_1^2} \quad (A)$$

$$NA = \sqrt{n_1^2 - n_2^2} \quad (B)$$

(Continued)

where Δ is formula (A), r is the distance from the fiber axis, n(r) is the nominal refractive index as a function of distance from the fiber axis, $n_1$ is the nominal refractive index on the axis of the fiber, $n_2$ is the refractive index of the cladding, a is the core radius, and g is a parameter that defines the shape of the profile, where the core diameter 2a is between 90 UM and 190 μM, the parameter g is between 1.2 and 1.8, and the numerical aperture (NA) of the fiber, formula (B), is between 0.2 and 0.3.

25 Claims, 6 Drawing Sheets

(56) References Cited

U.S. PATENT DOCUMENTS

| | | | |
|---|---|---|---|
| 9,588,287 B2* | 3/2017 | Hoshino | G02B 6/03694 |
| 2005/0013570 A1 | 1/2005 | Guan et al. | |
| 2008/0019650 A1 | 1/2008 | Hokansson et al. | |
| 2008/0026903 A1 | 1/2008 | Flugrad et al. | |
| 2009/0185780 A1 | 7/2009 | Matthijsse et al. | |
| 2010/0067858 A1* | 3/2010 | Kim | G02B 6/02023 385/124 |
| 2012/0183267 A1 | 7/2012 | Jiang et al. | |
| 2014/0270670 A1* | 9/2014 | Jiang | G02B 6/02023 385/124 |
| 2017/0038528 A1* | 2/2017 | Hoshino | G02B 6/03694 |

FOREIGN PATENT DOCUMENTS

| | | |
|---|---|---|
| WO | WO 2008/005233 A2 | 1/2008 |
| WO | WO 2012/010212 A1 | 1/2012 |

OTHER PUBLICATIONS

Written Opinion of the International Searching Authority from the European Patent Office in corresponding International Application No. PCT/EP2014/074106 dated Jul. 7, 2015.

* cited by examiner

MULTIMODE OPTICAL FIBER FOR POWER-OVER-FIBER APPLICATIONS WITH SPECIFIC REFRACTION INDEX PROFILE

CROSS REFERENCE TO RELATED APPLICATION

This application is a national phase application based on PCT/EP2014/074106, filed Nov. 7, 2014, the content of which is incorporated herein by reference.

BACKGROUND OF THE INVENTION

Field of the Invention

The present invention relates to a multimode optical fiber for transmission of high power over long distances. It refers also to a method for the transmission of high optical power over long distances.

Description of the Related Art

In standard fashion, an optical fibre is composed of an optical core the function of which is to transmit an optical signal, and an outer optical cladding the function of which is to confine the optical signal within the core. To this end, the refractive indices of the core ($n_{core}$) and the cladding ($n_{cladding}$) are such that $n_{core} > n_{cladding}$.

The refractive index profile denotes the graph of the function which associates the refractive index with the radius of the optical fibre. In standard fashion, the distance to the centre of the optical fibre is shown on the x-axis, and on the y-axis, the difference between the refractive index at that radial position and the refractive index of the outer optical cladding is shown. Generally, the refractive index profile is qualified according to its appearance.

Two main types of optical fibres exist, being multimode fibres and single mode fibres. In a multimode fibre, for a given wavelength, several optical modes are propagated simultaneously along the optical fibre, whereas in a single mode fibre modes of higher order are strongly attenuated.

Now, in a multimode fibre, the bandwidth is linked to the intermodal dispersion. In fact, the bandwidth results from the difference between the propagation times, or group delay times, of the optical modes along the fibre. In particular, for the same propagation medium (in a step index multimode fibre), the different modes have different group delay times. This results in a time lag between the pulses propagating in different radial positions. A time lag between the individual pulses causes a broadening of the resulting light pulse with a risk of this broadening being superimposed onto a following pulse, and therefore reducing the data rate supported by the fibre. The bandwidth is therefore directly linked to the group delay time of the optical modes propagating in the multimode core of the fibre. In order to guarantee a broad bandwidth, it is necessary for the group delay times of all the modes to be identical, for the intermodal dispersion to be zero, or at least minimized, for a given wavelength.

In order to reduce the intermodal dispersion in a multimode fibre, it has been proposed to produce graded index fibres with a "g" core profile, as in "Pulse broadening in graded-index optical fibers" (R. Olshansky and D. B. Keck, Applied Optics, Vol. 15, Issue 2, pp. 483-491, 1976) and in "Multiple-α index profiles" (R. Olshansky, Applied Optics, Vol. 18, Issue 5, pp. 683-689, 1979)

Multimode graded-index fibres with a "g" profile of the central core have been used for many years.

A graded-index profile can be defined by a relationship between the refractive index value n at a certain point as a function of the distance r from this point to the centre of the optical fibre:

$$n(r) = \begin{cases} n_1 \left[1 - 2\left(\frac{r}{a}\right)^g \Delta\right]^{1/2}, & r < a \\ n_2 & r > a \end{cases} \quad (1)$$

where $$\Delta = \frac{n_1^2 - n_2^2}{2n_1^2},$$

r is the distance from the fiber axis,
n(r) is the nominal refractive index as a function of distance from the fiber axis,
$n_1$ is the nominal refractive index on the axis of the fiber,
$n_2$ is the refractive index of the cladding, which is taken to be homogeneous for r≥a,
a is the core radius, and
g is a parameter that defines the shape of the profile.

For g that tends towards infinity, the graded-index multimode fiber becomes a multimode step index fiber.

When a multimode electromagnetic radiation propagates in said graded-index fiber, the different modes see a different propagation medium, which has a different effect on their speed of propagation. By adjusting the value of parameter g, it is therefore possible to obtain a group speed that is practically equal for all the modes and hence a reduced intermodal dispersion.

This adjustment of parameter g theoretically allows a group speed to be obtained that is practically equal for all the modes. The g parameter for which the bandwidth is maximum and the group velocity is the same for all modes is that equal to about 2. Therefore, generally, graded-index optical fibers are manufactured with a g parameter around the value of 2.

Departures of core shapes from the ideal g values (of about 2) in multimode fibers are considered undesirable by those skilled in the art, because such departures result in wider variation of the delay associated with each mode group, and therefore in reduction of the total bandwidth. Systems based on power over fiber (PoF) have been proposed for many applications as in "Power Transmission by Optical Fibers for Component Inherent Communication" (M. Dumke et al, Systemics, Cybernetics and Informatics, Vol. 8, No. 1, pp. 55-60, 2010), mainly for sensing in dangerous places such as high voltage substations, transmission lines, oil refineries, etc. Since high power laser diodes (HPLD) operating in 808-nm window are available, the main restrictions for PoF are the poor efficiency of GaAs or Si photovoltaic converters (PV) and the attenuation and power limits of standard multimode fibers. Due to this restriction, the applications of PoF are mostly for short distances, typically less than 200 m, and use sources having supply power of less than 2 W and 62.5-μm graded index or 105-μm step index multimode fiber. Currently, PoF applications, especially those in areas, such as, petroleum and maritime surveillance, call for longer links and/or more supply power.

In this context, an optimized fiber represents an important element in the PoF systems.

U.S. Pat. No. 5,115,486 relates to an optical multimode fiber for the transmission of laser radiation with high radiation output. Their initial output can exceed 100 W in the continuous-wave operation, and the peak output can be many MW in pulsed operation. In particular, optical graded-index profile fiber for transmission of laser radiation with high output with a core with diameter between $200 \cdot 10^{-6}$ m and $800 \cdot 10^{-6}$ m, exponent g is between 1.4 and 3.0 and the refractive index difference in $\Delta_{nk} = n_{ki} - n_{ka}$ is greater than $1.6 \cdot 10$ are disclosed.

EP 2 166 386 relates to multimode optical fibers with high bandwidth and ultra-low bend loss. They have graded refractive index profile, core radius of from 7 µm to 50 µm, profile shape alpha of from 1.6 to 2.2 and refractive index difference d1–d4 of from −0.019 to 0.032.

SUMMARY OF THE INVENTION

Graded index multimode optical fibers are fibers the refractive index of which substantially follows equation (1). Within the core region, the refractive index n(r) of a graded index fiber has a maximum at the fiber axis (r=0) having value equal to $n_1$, while in the cladding the refractive index is constant and equal to $n_2$.

In order to guide modes, $n_2$ should be smaller than $n_1$.

Although in U.S. Pat. No. 5,115,486 the problem of transporting high power within an optical fiber has been discussed, there is no hint about tackling the problem of transporting such high optical power as far as possible above a given power threshold within the fiber. Further, no consideration is made about a possible input optical power which might damage the fiber itself. Generally, the transport of high power within multimode optical fiber, for example for industrial or medical applications, is limited to distances in the fiber within dozens meters.

It is sought a multimode graded index optical fiber the characteristics of which are optimized in order to transport electromagnetic radiation having high optical power (above 1 W) as far as possible within the fiber keeping the optical power above a given power, pre-set for the desired application, but below a given threshold power possibly damaging the fiber itself.

A further goal of the invention is to transport within a multimode graded-index optical fiber only power not damaging or otherwise altering the optical fiber material.

The Applicant has realized that the transport of high optical power within the multimode optical fiber can be obtained by selecting a precise combination of parameters for the realization of the optical fiber itself, so that the distance of travel of an electromagnetic radiation having an optical power below the damaging power for the fiber and above a given pre-set power within the fiber can be maximized.

In particular, the Applicant has found that a predetermined g profile—different from the ideal value of g=2 which is generally the common value of g used for the realization of multimode graded index optical fibers—allows a multimode optical fiber to transport high optical power for distances far greater than 200 m.

According to a first aspect, the invention relates to a multimode optical fiber for continuous transmission of electromagnetic radiation at high power, said fiber defining a fiber axis and having a core surrounded by a cladding, and wherein the multimode optical fiber is a multimode graded-index fiber, the refraction index profile in the fiber essentially following the formula (1):

$$n(r) = \begin{cases} n_1 \left[1 - 2\left(\frac{r}{a}\right)^g \Delta\right]^{1/2}, & r < a \\ n_2, & r > a \end{cases} \quad (1)$$

where $$\Delta = \frac{n_1^2 - n_2^2}{2n_1^2},$$

r is the distance from the fiber axis,
n(r) is the nominal refractive index as a function of distance from the fiber axis,
$n_1$ is the nominal refractive index on the axis of the fiber,
$n_2$ is the refractive index of the cladding,
a is the core radius, and
g is a parameter that defines the shape of the profile,
characterized in that
the core diameter 2a is comprised between 90 µm and 190 µm,
the parameter g is comprised between 1.2 and 1.8,
and the numerical aperture NA of the fiber, where $$NA = \sqrt{n_1^2 - n_2^2}$$

is comprised between 0.2 and 0.3.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

In the present description and claims as "continuous transmission" it is meant that the power is injected and transported by the optical fiber in a non-pulsed way.

The input continuous power however is preferably a continuous constant power having always substantially the same value, but it might also include power oscillations.

The Applicant has considered the optical power of an electromagnetic radiation inputted into a multi-mode graded-index optical fiber $P_{in}$, a power threshold $P_{thr}$, corresponding to the maximum allowed power which can be inputted into the fiber without causing damage to it, and a desired pre-set power $P_L$ below which the power within the fiber of the invention should not go up to a given distance L (considering the origin of the ordinate at the input where the electromagnetic radiation is introduced in the multimode fiber of the invention).

$P_L$ is the power at a location L inside the multimode optical fiber of the invention. In case the fiber has a length equal to L, $P_L$ is the output power, i.e. the power at the end of the fiber that in PoF applications is converted in electrical energy to drive electronic circuits and sensors of interest.

The Applicant has realized that, in order to maximize the distance L travelled by electromagnetic radiation within the fiber, said electromagnetic radiation having always a power lower than the threshold power $P_{thr}$ which can damage the fiber and, at the same time, above the pre-set power $P_L$, at least up to the distance L, the following equation is to be considered:

$$L = (P_{in} - P_L)/\alpha$$

where α is the attenuation,
and maximized. $P_{in}$, which is the power of the electromagnetic radiation at input of the fiber, should be kept lower than $P_{thr}$. $P_L$ is the pre-set power which is the power at a distance L from the input of the electromagnetic radiation within the fiber. L is the distance to be maximized, that is the fiber is optimized so that an electromagnetic radiation can travel within the fiber with an optical power above $P_L$ for the longest distance L, where the optical power of the electromagnetic radiation is also always below the threshold power $P_{thr}$ which is defined below and it is the power above which the material in which the fiber is realized might be damaged.

The Applicant has understood that one of the relevant parameter to be considered in order to maximize the quantity L, i.e. the distance travelled by the electromagnetic radiation, keeping the power above the $P_L$ and below the $P_{thr}$, is the parameter g of the refractive index profile. Attenuation is a relevant parameter is order to determine how the optical power inputted in the fiber attenuates with the distance from the input.

In case $P_{in}$ (with $P_{in}$ below $P_{thr}$) and $P_L$ are two given quantities, i.e. two constants set by the user who desires, having a given electromagnetic source such as laser having a maximum power $P_{in}$, to obtain a given power as output $P_L$, or at a distance L, the equation to be maximized in order to obtain the longest distance which can be travelled by this radiation keeping a power above $P_L$ is then equal to $$L = (P_{in} - P_L)/\alpha(g), \quad (2)$$

where the attenuation is equal to $\alpha(g) = \frac{C(g,p)}{\Delta}\left(\frac{a^2}{\Delta}\right),$ (3)

and C(g, p) is given by $$C(g, p) = \frac{d}{2}\frac{Z_1^2(v)}{D^{2p}}\left(\frac{g+2}{4g}\right)^{1+p}\left(1 + \frac{[p(g-2)-2]}{g+2}\right)^2, \quad (4)$$

as found and discussed in "*Mode Coupling Effects in Graded-Index Optical Fibers*," (R. Olshansky, Appl. Opt. 14, pp. 935-945, 1975), where g is the parameter index profile, p is a parameter related to the influence of external conditions on the fiber, $Z_1(v)$ is the first zero of the Bessel function; d and D are constants related to the coupling strength and correlation length, respectively. The conditions in which p=2 are the most realistic ones, where the external stress conditions, diameter variation, etc., are increasing the modal coupling.

Applicant has found that, if the refractive index profile of the multimode graded-index profile has a g parameter which is equal to g≅1.3, a minimum of the attenuation is obtained. In case $P_{in}$ and $P_L$ are constant, with $P_{in}$ below $P_{thr}$, this, in turn, implies a maximum in the value of L of equation (2) which is inversely proportional to the value of the attenuation. Regardless of the wavelength inputted into the fiber and of the size of the fiber core, the electromagnetic radiation having input power $P_{in}$ would reach the maximum possible distance L(g) inside the fiber if a multimode optical fiber is manufactured with a parameter g equal to 1.3 before attenuating its optical power below the value $P_L$.

Further, it is clear from equation (2) that the maximum L can be obtained for the maximum input power $P_{in}$. The maximum power which can be inputted in the fiber is the threshold power $P_{thr}$ above which the material in which the fiber is formed can be damaged.

An electromagnetic radiation having a too high optical power inputted into an optical fiber may damage the latter, for example by burning the material, such as silica, in which the optical fiber is formed. For a multimode optical fiber, the threshold value of such a threshold optical power above which damage of the fiber may occur corresponds to 3.6 MW/cm² as obtained in "*Experimental data on the fiber fuse*," (D D Davis, S C Mettler, and D J DiGiovanni, Proc SPIE 2714, 27th Annual Boulder Damage Symposium: Laser-Induced Damage in Optical Materials: 1995, pp. 202-210, 1996).

In order to obtain a threshold input optical power for a given fiber from this threshold power density, the threshold value of the optical density has to be multiplied by the modal field diameter (MFD) of the multimode fiber, which is also a function of refractive index profile n(r), thus of parameter g, of the numerical aperture NA of the fiber where $$NA = \sqrt{n_1^2 - n_2^2}$$

and of the diameter 2a of the optical fiber core.

The following equation used to obtain the MFD is obtained using the approximation described in "*Gaussian approximation of the fundamental modes of graded-index fibers*," (D. Marcuse, J. Opt Soc Am 68, pp. 103-109, 1978):

$$\frac{w}{a} = \frac{A}{V^{2/(g+2)}} + \frac{B}{V^{3/2}} + \frac{C}{V^6} \quad (5)$$

where V is the normalized frequency or V-number is defined as V=(2aπ/λ)NA and Δ is the wavelength of the inputted electromagnetic radiation. The parameters A, B and C are given by the equations below written which can also be found in the already quoted article "*Gaussian approximation of the fundamental modes of graded-index fibers*," (D. Marcuse, J. opt Soc Am 68, pp. 103-109, 1978):

$$A = \left\{\frac{2}{5}\left[1 + 4\left(\frac{2}{g}\right)^{5/6}\right]\right\}^{1/2},$$

$$B = e^{0.298/g} - 1 + 1.478(1 - e^{-0.077g}),$$

$$C = 3.76 + \exp(4.19/g^{0.418}).$$

From these equations, by multiplying the experimentally obtained threshold power density of 3.6 MW/cm² by the effective area of the MFD, the input threshold optical power $P_{thr}$—which can be used and below which the optical fiber is most probably not damaged—is given by (in dBm)

$$P_{thr}(g) = 10 \log [3.6\pi w^2], \quad (6)$$

where 3.6 in equation (6) is the experimental threshold power density.

Introducing equation (5) in equation (6), the input threshold optical power results $$P_{thr}(g) = 10\log\left[3.6\pi 10^{13} a^2 \left(\frac{A(g)}{V^{2/(g+2)}} + \frac{B(g)}{V^{3/2}} + \frac{C(g)}{V^6}\right)^2\right], \quad (7)$$

which is a function of the parameter g, of the wavelength of the inputted electromagnetic radiation and of the diameter of the core of the multimode optical fiber.

Therefore, equation (2), in which the maximum distance which can be travelled by an electromagnetic radiation having a given input optical power before its optical power falls below a pre-set optical power $P_L$ depending on the application), can be calculated for the maximum possible input optical power $P_{in}=P_{thr}$ given in equation (7) which does not damage the fiber.

Accordingly, the maximum input optical power which can be used in calculating L of equation (2) is the optical power of equation (7) which represents the maximum optical power which does not damage the fiber:

$$L = (P_{in} - P_L) \bigg/ \frac{C(g,p)}{\Delta}\left(\frac{a^2}{\Delta}\right) = \frac{P_{thr} - P_L}{\alpha} \quad (8)$$

$P_L$ is a constant value and it is set by the user as the desired output of the fiber or the desired power at a distance L from the input, i.e. the power after a distance L which is to be maximized.

The maximum of the curve of equation (8) as a function of g is not given by the minimum of the attenuation, because a dependence from g is present in the input threshold optical power of equation (7) as well.

The Applicant has found that equation (8) has a maximum as a function of g for a g value comprised between 1.2 and 1.8, when electromagnetic radiation having a wavelength comprised between 750 nm and 1000 nm (which is a wavelength range comprising the common wavelengths used by standard lasers or diodes for inputting electromagnetic radiations in fibers) and a fiber having a diameter of the core comprised between 90 μm and 190 μm and a numerical aperture comprised between 0.2 and 0.3 are used.

Preferably, this range of diameters of the multimode fibers is considered because it is the most suitable for power over fibers applications in order to adapt to the active area of photovoltaic converters and to the core size of high power laser fiber output.

Preferably, the core of the fiber of the invention has a diameter comprised between 95 μm and 110 μm.

For a value of g between 1.2 and 1.8, the pre-set power $P_L$ can be set above 30 dBm. For such a power, a distance L of above 500 meters can be reached, i.e. after more than 500 meters in the fiber, the optical power of the electromagnetic radiation is still above 30 dBm, considering an input power below the threshold of equation (7).

The desired output power $P_L$, which can be considered as the desired output power after the length L, is set before the calculation of the maximum L is made, so that the maximum L to obtain such desired optical power value $P_L$ is obtained.

It is shown by Applicant that for a multimode fiber having a g comprised between 1.2 and 1.8, for a wide range of high output powers $P_L$ (e.g. for output powers up to 50 dBm, for example between 25 dBm and 33 dBm) the maximum obtainable length L of the fiber along which the electromagnetic radiation can travel having an optical power above such output power is above 500 meters, preferably above 1000 m.

It is to be understood that the optical fiber of the invention suitable for transmitting high optical power and, at the same time, operating with optical power not causing damage to its structure, can also be used for data communication, simultaneously or not with the transmission optical energy. Such an optical fiber can be used to transport both data and power.

According to a second aspect, the invention relates to a method for transmitting radiation at high power along an optical fiber, including:
  inputting continuously electromagnetic radiation having an input optical power equal or greater than 1 W and a wavelength comprised between 750 nm and 1000 nm into a multimode optical fiber, wherein said multimode optical fiber defines a fiber axis and comprises a core and a cladding surrounding the core, and wherein the multimode optical fiber is a graded-index optical fiber, the refraction index profile in the fiber essentially following the formula:

$$n(r) = \begin{cases} n_1\left[1 - 2\left(\frac{r}{a}\right)^g \Delta\right]^{1/2}, & r < a \\ n_2, & r > a \end{cases}.$$

where $$\Delta = \frac{n_1^2 - n_2^2}{2n_1^2},$$

r is the distance from the fiber axis,
n(r) is the nominal refractive index as a function of distance from the fiber axis,
$n_1$ is the nominal refractive index on the axis of said optical fiber,
$n_2$ is the refractive index of the cladding,
a is the core radius, and
g is a parameter comprised between 1.2 and 1.8; and
obtaining an output power of at least 30 dBm after a length of at least 500 m.

Preferably, the method of the invention comprises transmitting radiation at high power for a length of at least 1000 m.

The fiber of the invention can be used to transport electromagnetic radiation at high power for relatively long distances. The electromagnetic radiation can travel into the multimode fiber for a very long distance L before its optical power decays below a given pre-set optical power $P_L$.

This input electromagnetic radiation has a wavelength comprised between 750 nm and 1000 nm which are the values selected for the calculation of the maximum distance of equation (8). The input power is preferably of at least 1 W. Preferably, the input power is above 2 W.

Modulated power allows the transmission of data and not only of power in the multimode fiber of the invention.

According to a third aspect, the invention relates to a method of optimization of the refractive index profile for maximizing the distance of transmission of electromagnetic radiation within a multimode optical fiber while maintaining an optical power of said electromagnetic radiation travelling in said multimode optical fiber above a given pre-set value of optical power, the multimode optical fiber defining a fiber axis and including a core surrounded by a cladding, wherein the multimode optical fiber is a graded-index fiber refractive index profile essentially follows the following formula:

$$n(r) = \begin{cases} n_1\left[1 - 2\left(\frac{r}{a}\right)^g \Delta\right]^{1/2}, & r < a \\ n_2, & r > a \end{cases}$$

where $$\Delta = \frac{n_1^2 - n_2^2}{2n_1^2},$$

r is the distance from the fiber axis,
n(r) is the nominal refractive index as a function of distance from the fiber axis,
$n_1$ is the nominal refractive index on the axis,
$n_2$ is the refractive index of the cladding,
a is the core radius, and
g is a parameter that defines the shape of the profile, the method comprising:
   selecting an electromagnetic radiation to be input in the multimode optical fiber having a wavelength comprised between 750 nm and 1000 nm in said multimode optical fiber and having an input optical power above 1 W;
   selecting said pre-set value of optical power; and
   selecting the parameter g between 1.2 and 1.8.

Preferably, the method may include the step of selecting the numerical aperture of the fiber.

More preferably, said numerical aperture is comprised between 0.2 and 0.3.

In a fourth aspect, the present invention relates to an optical cable comprising a multimode optical fiber for continuous transmission of electromagnetic radiation at high power, said fiber defining a fiber axis, a core and a cladding surrounding the core, and wherein the multimode optical fiber is a multimode graded-index fiber, the refraction index profile in the fiber essentially following the formula:

$$n(r) = \begin{cases} n_1 \left[1 - 2\left(\frac{r}{a}\right)^g \Delta\right]^{1/2}, & r < a \\ n_2, & r > a \end{cases}.$$

where $$\Delta = \frac{n_1^2 - n_2^2}{2n_1^2},$$

r is the distance from the fiber axis,
n(r) is the nominal refractive index as a function of distance from the fiber axis,
$n_1$ is the nominal refractive index on the axis of the fiber,
$n_2$ is the refractive index of the cladding,
a is the core radius, and
g is a parameter that defines the shape of the profile,
characterized in that
the core diameter 2a is comprised between 90 μm and 190 μm,
the parameter g is comprised between 1.2 and 1.8,
and the numerical aperture (NA) of the fiber, where $$NA = \sqrt{n_1^2 - n_2^2}$$

is comprised between 0.2 and 0.3.

Preferably, said cladding and/or said core includes silica.
Advantageously, said cladding includes non-doped silica.
Preferably, the refractive index difference is obtained by doping the core and not the cladding which preferably remains non-doped.

Preferably, the cladding can be homogeneous, i.e. it can have a substantially constant refractive index $n_2$. In some embodiments, the cladding can advantageously have a thickness comprising a region with refractive index depressed with respect to the cladding refractive index $n_2$ and referred to as trench. Such a depressed refractive index can be obtained by fluorine-doping and/or providing holes or voids in the trench, as described, for example, in WO 2008/005233, US 2009/0185780 and WO2012/010212. The presence of said trench can provide a decrease in the bending loss.

In order to change the refractive index profile of the core according to equation (1), the core should be doped. The cladding preferably remains non-doped (pure silica index profile with a constant refractive index) in order to obtain the desired transmission characteristics, resulting in a cheaper manufacturing process.

In a preferred embodiment, said core includes doped silica.

In order to obtain a refractive index profile such as in equation (1) and with the preferred g parameter comprised between 1.2 and 1.8 a suitable doping of the core material is performed. Preferably this doping can includes $GeO_2$ (germanosilicate), $P_2O_5$ (phosphosilicate) and/or $Al_2O_3$ (aluminosilicate).

Preferably, said fiber has a refractive index difference between said core and said cladding ($n_1-n_2$) comprised between 0.0556 and 0.0725.

Preferably, the diameter of the multimode optical fiber diameter is comprised between 125 μm and 500 μm.

The diameter of the fiber is the external diameter of the cladding.

Preferably, according to the second and/or third aspects, in the method(s) of the invention said multimode graded-index fiber has a core diameter of from 90 μm to 190 μm, more preferably comprised between 95 μm and 110 μm.

Advantageously, the g parameter is of from 1.3 to 1.6.

Preferably, the wavelength of the inputted electromagnetic radiation is comprised between 800 nm and 900 nm.

Advantageously, the method of the invention includes outputting from said multimode optical fiber at said length or distance of at least 1000 m, an electromagnetic radiation having an optical power of at least 25 dBm.

More preferably, said optical power at a distance or length L of at least or above 1000 meters is of at least 30 dBm. Using the fiber and/or the method of the invention, a relatively high optical power also after a relatively long length (distance L) of the fiber is obtained.

Advantageously, inputting said electromagnetic radiation includes inputting an electromagnetic radiation having an optical power below an input threshold value.

Preferably, the input optical power is above 2 W.

Preferably, the input threshold value of said input optical power is given by equation (7).

Preferably, said pre-set value of optical power is up to 50 dBm, more preferably it is of at least 25 dBm.

BRIEF DESCRIPTION OF THE DRAWINGS

The invention will be better described below with non-limiting reference to the appended drawings where.

DETAILED DESCRIPTION OF ONE OR MORE EMBODIMENTS OF THE INVENTION

Figure 1:
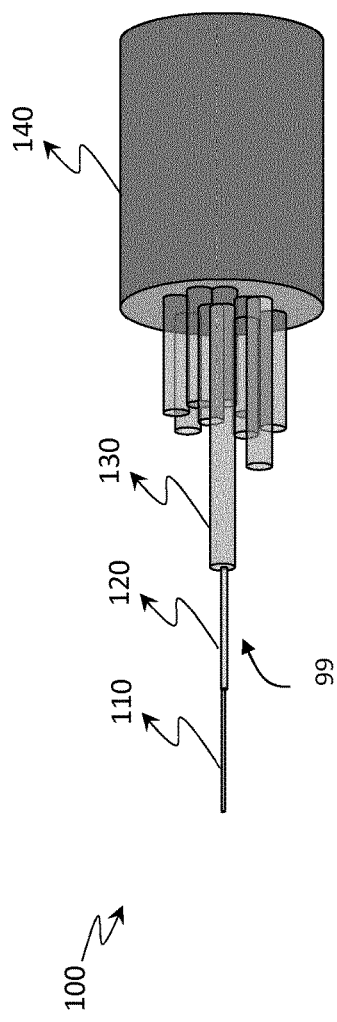
FIG. 1 shows a perspective view of an embodiment of an optical cable including an optical fiber according to the invention.

As shown in FIG. 1, an optical cable 100 for the transmission of "high" power and preferably also of data including a multimode optical fiber 99 is depicted.

The multimode optical fiber 99 of the invention may not be part of an optical cable but can also be used as a single fiber.

The optical fiber 99 includes a core 110 and a cladding 120 surrounded by one or more coating layers 130 for protection. The optical cable 100 may include a plurality of optical fibers 99 surrounded by an outer sheath 140 for protection from the external environment.

Figure 11:
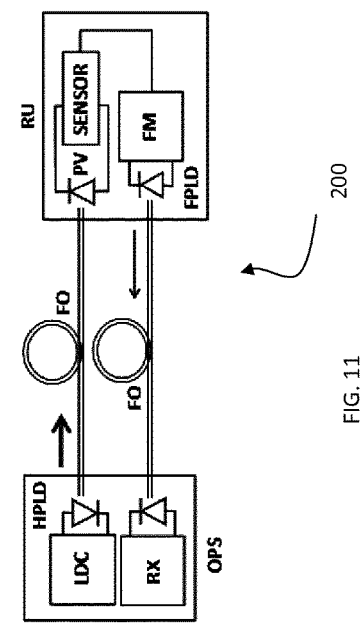
FIG. 11 is a schematic view of an application of the fiber of the invention.

FIG. 11 shows an example of application of the optical fiber 99 in a power over fiber application. A system 200 includes three parts: an optical power source OPS comprising a high power laser diode HPLD, a laser diode controller LDC and an optical receiver RX, a remote unit RU (containing a sensor S, a photovoltaic converter PV, a Fabry Perot semiconductor laser FPLD and a converter and driver circuitry FM) and fibers FO realized as fiber 99 according to the invention, connecting the power source OPS with RU. It is possible to use extra HPLDs and fibers 99 to increase the transmitted power. It is also possible to connect other photovoltaic converters PVs to increase the converted power in the remote unit RU. Photovoltaic converters PVs typically have an active area between 62.5 μm and 100 μm and generally operate at a wavelength of 850 nm.

Figure 2:
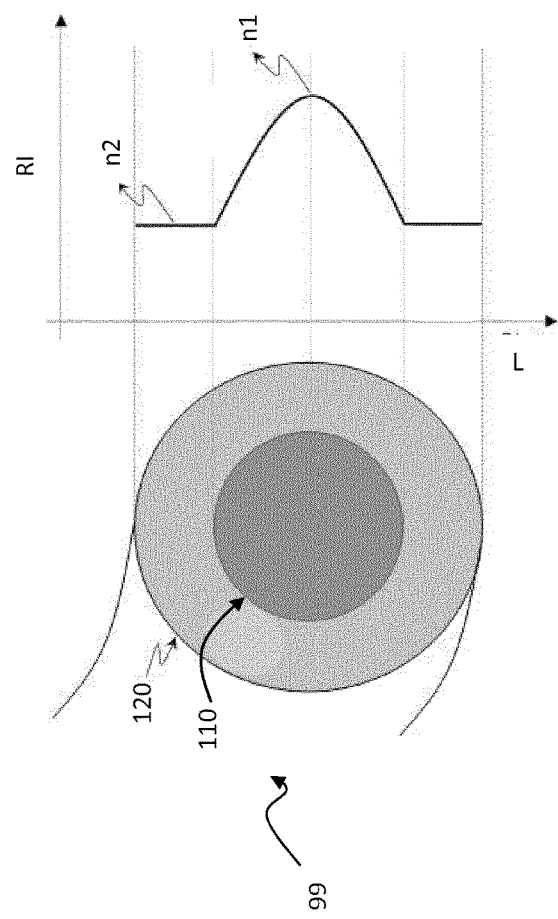
FIG. 2 shows a graph of a refractive index profile of an optical fiber according to the invention.
Figure 3:
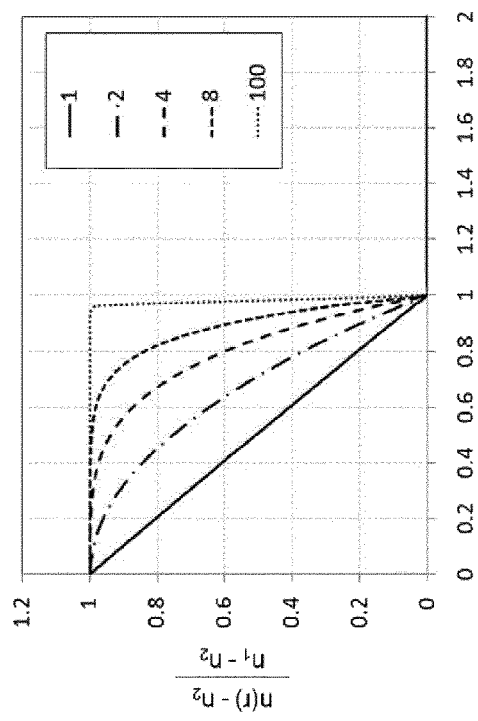
FIG. 3 shows several profiles of a refractive index of multimode optical fiber core normalized to the parameter g ranging from 1 to 100, these profiles represents fibers not belonging to the invention.

The index profile of the multimode fiber according to the invention is substantially according to the graph depicted in FIG. 2. In order to appreciate the possible index profiles achievable by changing the g parameter of equation (1), FIG. 3 shows the variation of the index profile n(r) for different g values. When the parameter g is equal to unity (g=1), the index profile is linear; when parameter g has the value 2, g=2, the profile is parabolic; when g tends to infinity, the optical fiber profile is a step index one.

With reference to FIG. 2, the optical fiber 99 includes the core 110 and the cladding 120 and the refractive index within the core has a maximum value $n_1$ in the center of the core and the cladding has a constant refractive index $n_2$, for example equal to the value of pure silica. The refractive index profile according to FIG. 2 is obtained by means of a suitable doping of the core of the multimode optical fiber, for example by germanium oxide.

The multimode optical fiber 99 is optimized so that it can transport high power, e.g. power above 1 W, preferably about 2 W, for long distances, e.g. distances above 1000 meters.

The electromagnetic radiation inputted in the fiber preferably has a wavelength λ comprised between 750 nm and 1000 nm and more preferably between 800 nm and 900 nm, typical for high power diodes for power over fiber applications; where the photoconverters PVs, have conversion efficiency of the order of 40%, meaning that 40% of the optical power is transformed in electrical energy to drive circuitry of receiving unit RU (see FIG. 11).

The attenuation of the fiber is calculated using the following equation $$\alpha(\text{dB/km}) = \alpha_{intrinsic} + \frac{M(4-3g)^2(2+g)}{g^3}, \quad (9)$$

where the intrinsic attenuation ($\alpha_{intrinsic}$) depends on the wavelength of the inputted electromagnetic radiation and the multiplicative factor M depends on the radius of the core of the fiber. Equation (9) is a simplification of the attenuation formula (3) obtained incorporating the various parameters shown in equation (4) into a single multiplicative constant whose value can be obtained by imposing that the attenuation profile for a step (g→∞) fiber to be the value found generally in literature. The attenuation according to equation (9), regardless of the wavelength of any radiation inputted into the multimode fiber, the diameter of the core and of the refractive index difference between core and cladding or of the numerical aperture NA, has a minimum for g=1.333.

The fibers is a multimode fiber with a diameter of the core comprised between 90 μm and 190 μm, more preferably between 95 μm and 110 μm, and a natural aperture NA comprised between 0.2 and 0.3 in order to better match with the characteristics of photovoltaic converters used in power over fibers applications. Preferably the whole fiber diameter can vary from 125 μm to 500 μm, where the whole fiber diameter will depend on the choice of the fiber core diameter.

In order to calculate the attenuation of the fiber, the intrinsic attenuation and the constant M as per equation (9) for different wavelengths have to be calculated. In literature, the value for a wavelength equal to 808 nm of $\alpha_{int}$ and M are known and respectively equal to 2.5 dB/km and 9.5.

In the Table 1 it is reported the intrinsic attenuation, $\alpha_{int}$, the attenuation of step index fiber obtained experimentally and the constant M calculated by the Applicant and used in the following.

TABLE 1

| Wavelength (nm) | Intrinsic attenuation (dB/km) | Attenuation for g→∞ (dB/km) | M |
|---|---|---|---|
| 808 | 2.50 | 12 | 9.5/9 |
| 850 | 2.04 | 14 | 11.95/9 |
| 980 | 1.155 | 10.8 | 9.65/9 |

Using the above values, the equation $$L = (P_{in} - P_L) \Big/ \frac{C(g, p)}{\Delta}\left(\frac{a^2}{\Delta}\right) = \frac{P_{thr} - P_L}{\alpha}$$

has been maximized, i.e. the maximum L has been calculated, as a function of the parameter g, and where $P_{in}$ has been put equal to $P_{thr}$, i.e. the maximum input power above which the fiber can be damaged.

The other parameters of the equation are set according to the following.

The diameter of the core of the fiber has been set equal to 100 μm.

The numerical aperture NA of the fiber has been set equal to 0.22.

The power of the electromagnetic radiation inputted into the multimode fiber 99 is limited either by the maximum power of the laser source or diode source or by the maximum threshold power of equation (7) above which the material in which the fiber is realized can be damaged. The Applicant has found that for g below about 2, which—as shown below—are the relevant g for the present case, the threshold power of the equation (7) is the power to be considered.

Indeed, another possible limitation in the value of $P_{in}$ is not only the value of the input power above which the fiber could be damaged, but the maximum power that is emitted by the available electromagnetic radiation source, such as laser source. Accordingly, the input power of the electromagnetic radiation is preferably below the minimum between the $P_{thr}$ and the maximum power available from the available radiation sources $P_{las}$, $$P_{in}=\min\{P_{thr},P_{las}\}. \quad (10)$$

Applicant has found that for the range of parameter g of interest, the minimum power among the two considered in equation (10) is always the threshold power $P_{thr}$, having the generally available laser sources an emitted power above 5 W in continuous emission.

Figure 4:
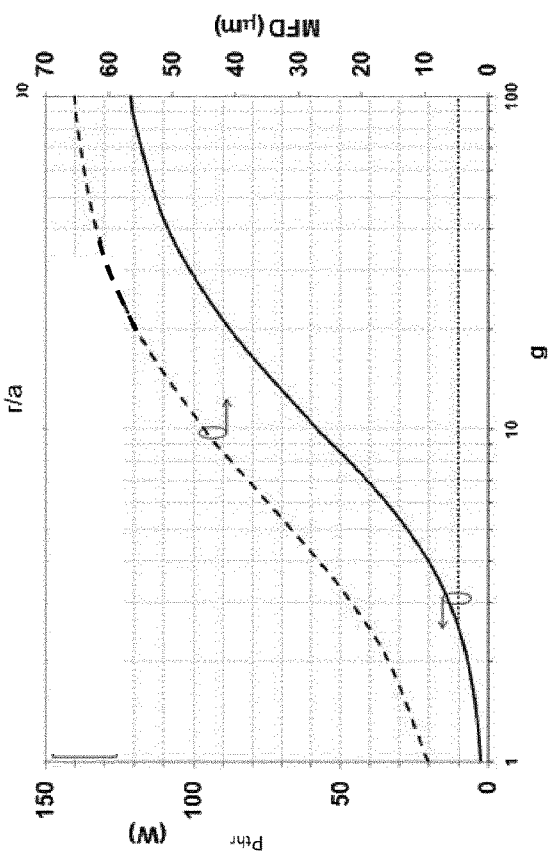
FIG. 4 shows a plurality of graphs representing the MFD, the power threshold and the minimum threshold and the power of laser power, for example 10 W, depending on the variation of the index profile g.

This can be seen for example in FIG. 4, which shows the MFD of the multimode optical fiber according to equation (5) and the power threshold $P_{thr}$ of equation (7), both obtained as a function of the index profile parameter g. As further illustrated in FIG. 4, the straight constant dotted line represents the maximum laser or source power (which is constant and set to a value of 5 W), the solid curve represents the power threshold $P_{thr}$ (W) as the solution of equation (7). The dashed curve represents MFD as solution of equation (5). For "small" g values, the relevant threshold power to be considered is the threshold power of equation (7), being the lowest one among the maximum source power (dotted line) and the threshold power (solid curve). Thus, in the following, it is considered that the value of $P_{in}$ in equation (8) has to be the limiting input power that is the threshold power of equation (7).

Figure 5:
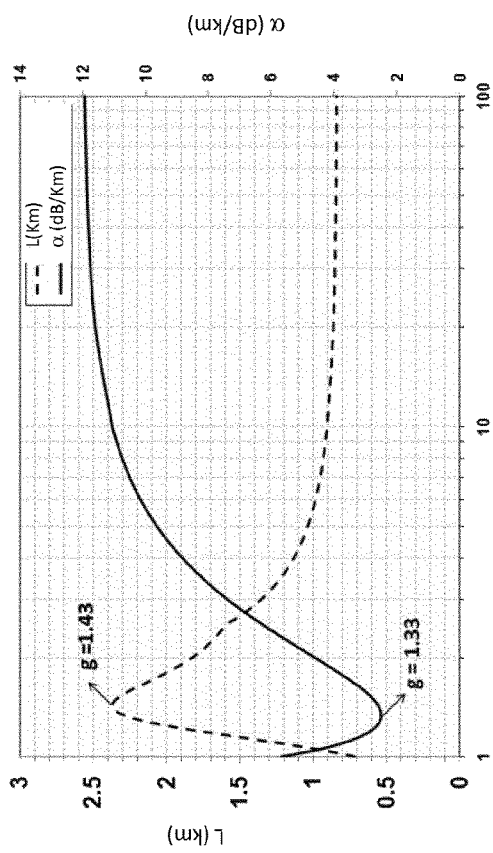
FIG. 5 shows a graph of the attenuation (solid curve) for multimode fiber and a graph for the distance L (dashed line) vs the profile parameter g the power of release laser, for example 10 W (dashed curve)

FIG. 5 shows two graphs, a solid curve representing the attenuation of the multimode optical fiber as a function of g and a dashed curve representing the maximum length or distance L which an electromagnetic radiation having an input power equal to the threshold power $P_{thr}$ of equation (8) and a desired pre-set power $P_L$ of 30 dBm can travel, again as a function of g. The wavelength λ of the inputted electromagnetic radiation is set to be equal to 808 nm.

As already mentioned, the minimum of the attenuation is obtained for g=1.33.

The maximum reachable distance L occurs for index profile parameter of g=1.43. At this profile index parameter g, the distance or reach L is of 2.30 km, which is the maximum distance which an electromagnetic radiation having an input power equal to $P_{thr}$ can travel within the multimode optical fiber keeping its optical power above or equal to the pre-set value $P_L$. For a more common parabolic profile fiber having g=2 the maximum distance L that the same electromagnetic radiation having input power equal to $P_{thr}$ could travel would be of 1.78 km. Conversely, for step index multimode fibers the maximum distance L achievable launching 10 W as input power in the multimode optical fiber would be of 0.84 km. Thus, by using the index profile of the fiber of the invention, a maximum distance L or reach is increased by about 174% with respect to a step index profile fiber, and by about 29% with respect to a graded index profile with g=2. This result is confirmed by the following graphs of FIGS. 6-9. The following graphs have been all obtained for a multimode fibers where the diameter of the core is equal to 100 μm and NA=0.22.

Figure 6:
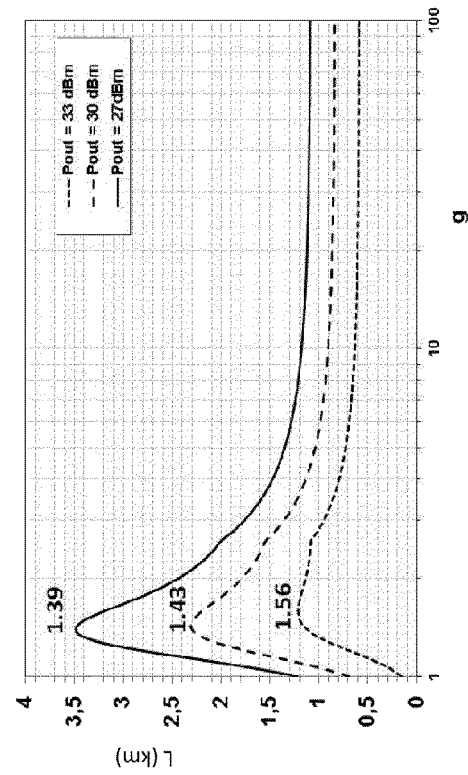
FIG. 6 shows three graphs of the distance L as a function of the parameter g for three different set output power, fixed wavelength at 808 nm.

In FIG. 6, the desired pre-set value of the optical power $P_L$ is changed (in the example above of FIG. 5 a pre-set desired power $P_L$ has been set equal to 30 dBm). Three different output powers are set: 33 dBm (short dashed curve), 30 dBm (long dashed curve) and 27 dBm (solid curve). Equation (8) is maximized for the three values of the output power as a function of the parameter g. A "long distance" L is obtained for an electromagnetic radiation inputted with a wavelength of 808 nm at the threshold input power of equation (7) for a fiber having a g parameter within 1.2 and 1.8. The maximum reachable distances L are all above 1000 meters: for $P_L$ equal to 33 dBm the best g is 1.56 and the maximum L is 1.2 Km; for $P_L$ equal to 30 dBm the best g is 1.43 and the maximum L is 2.35 Km and for $P_L$ equal to 27 dBm the best g is 1.39 and the maximum L is 3.5 Km.

Figure 7:
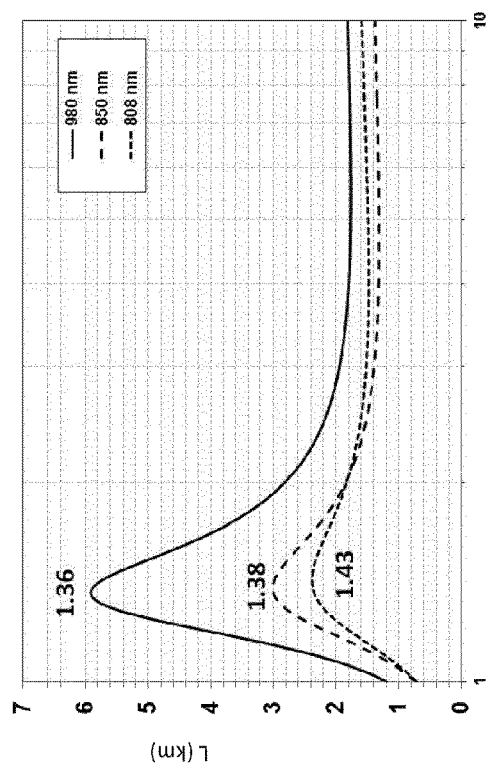
FIG. 7 shows three graphs of the distance L as a function of the parameter g for three different wavelengths for a fixed $P_L$=30 dBm.

In FIG. 7, the input wavelength of the electromagnetic radiation inputted in the multimode optical fiber of the invention is changed. Three input wavelengths are set: 980 nm (solid line), 850 nm (long dashed line), and 808 nm (short dashed line). Equation (8) is maximized for the three values of the wavelength as a function of the parameter g, using Table 1 above. The desired pre-set optical power value $P_L$ is set equal to 30 dBm. A "long distance" L (above 500 meters and above 1000 meters) is obtained for an electromagnetic radiation inputted at the threshold input power of equation (7) for a fiber having a g parameter within 1.2 and 1.8.

Figure 8:
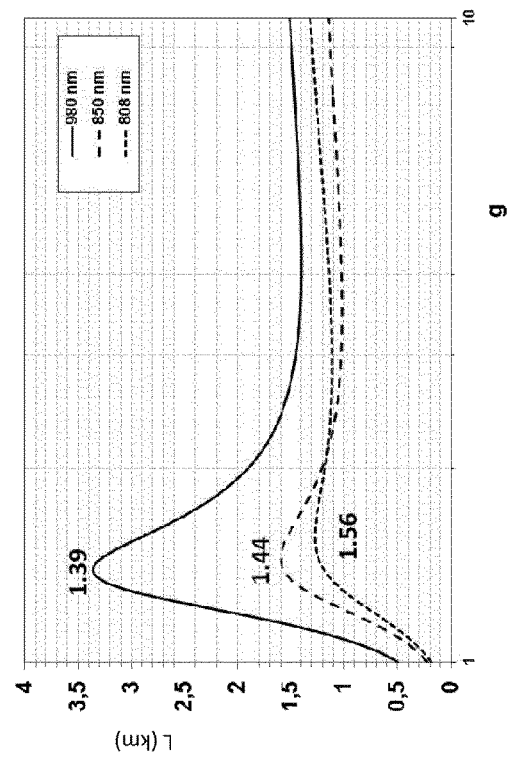
FIG. 8 shows three graphs of the distance L as a function of the parameter g for three different wavelengths for a fixed $P_L$=33 dBm.

FIG. 8 is analog to FIG. 7, with the difference that the desired pre-set optical power value $P_L$ is set equal to 33 dBm. With this higher desired output power, the reached distance is still above 1000 m.

Figure 10:
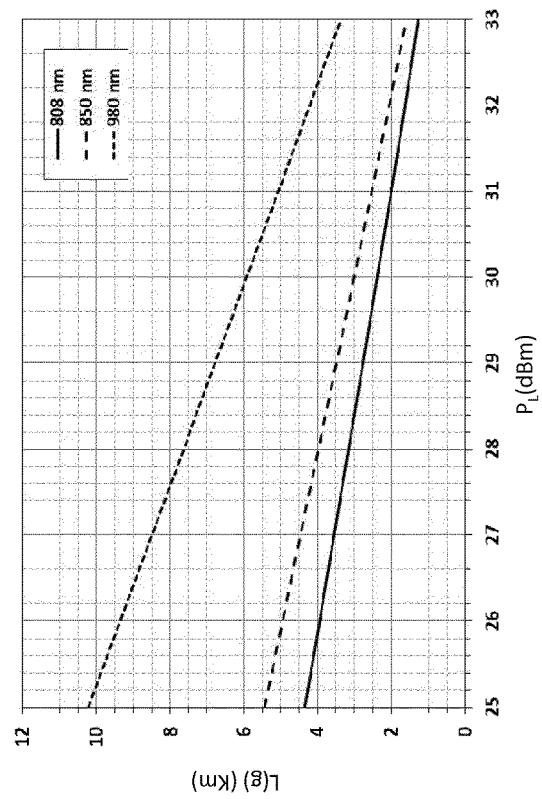
FIG. 10 depicts three curves at the three different wavelengths as a function of $P_L$, for the three wavelengths above. The "Reach at best g" is the maximum distance at the best g.

FIG. 10 shows three graphs of the maximum distance L for the g value that maximizes eq. (8) as a function of the desired output power $P_L$ for three different wavelengths of the electromagnetic radiation inputted in the multimode optical fiber of the invention. As shown, for the range of desired pre-set powers $P_L$ between 25 dBm and 33 dBm, the distance L which can be travelled by the electromagnetic radiation having an input power equal to $P_{thr}$ and keeping this power above $P_L$ is always above 1000 m.

Figure 9:
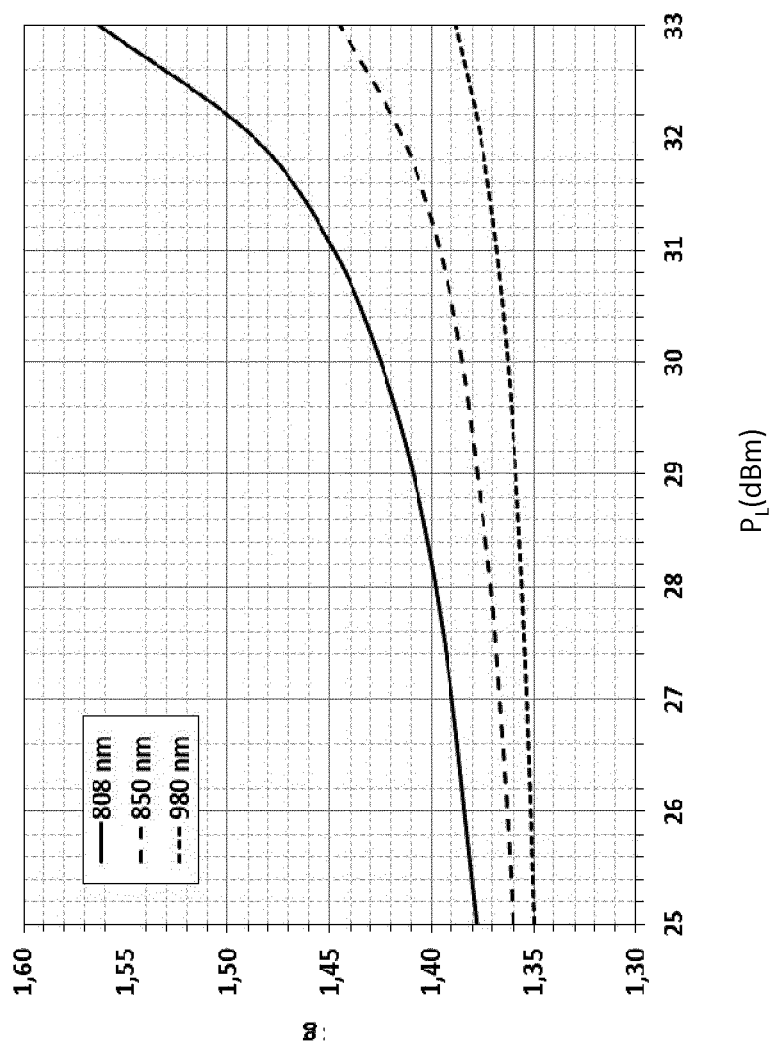
FIG. 9 depicts three curves at the three different wavelengths as a function of $P_L$, for the three wavelengths above. The "best g" is the g that gives the maximum distance.

FIG. 9 depicts the "best g" as a function of the pre-set power $P_L$, for the three wavelengths above. The best g is the g that gives the maximum reach or distance L, i.e. the value of g that maximizes equation (8). It is clear that for the pre-set power values of interest, the parameter g is included in a range 1.3-1.6, accordingly manufacturing an optical fiber having a refractive index profile with a g in this range allows to obtain the desired optical power $P_L$ at a distance L (where L is >1000 m).

The invention claimed is:

1. A multimode optical fiber for continuous transmission of electromagnetic radiation at high power, said fiber defining a fiber axis and comprising a core and a cladding surrounding the core, wherein the multimode optical fiber is a multimode graded-index fiber, the refraction index profile in the fiber essentially following the formula:

$$n(r) = \begin{cases} n_1\left[1 - 2\left(\frac{r}{a}\right)^g \Delta\right]^{1/2}, & r < a \\ n_2, & r > a \end{cases}$$

-continued $$\Delta = \frac{n_1^2 - n_2^2}{2n_1^2},$$

where:
r is a distance from the fiber axis,
n(r) is a nominal refractive index as a function of distance from the fiber axis,
$n_1$ is a nominal refractive index on the axis of the fiber,
$n_2$ is a refractive index of the cladding,
a is a core radius, and
g is a parameter that defines a shape of the profile,
wherein:
a core diameter 2a is between 90 µm and 190 µm,
the parameter g is between 1.2 and 1.8, and
a numerical aperture (NA) of the fiber, where $$NA = \sqrt{n_1^2 - n_2^2},$$

is between 0.2 and 0.3.

2. The multimode optical fiber according to claim 1, wherein said cladding comprises non-doped silica.

3. The multimode optical fiber according to claim 1, wherein said core comprises doped silica.

4. The multimode optical fiber according to claim 1, wherein said fiber has a refractive index difference between said core and said cladding ($n_1$–$n_2$) between 0.0556 and 0.0725.

5. The multimode optical fiber according to claim 1, wherein said multimode graded-index fiber has a core diameter between 95 µm and 110 µm.

6. The multimode optical fiber according to claim 1, wherein said g parameter is between 1.3 and 1.6.

7. A method for transmitting radiation at high power along an optical fiber, comprising:
inputting continuously electromagnetic radiation having an input optical power equal or greater than 1 W and a wavelength between 750 nm and 1000 nm into a multimode optical fiber, wherein said multimode optical fiber defines a fiber axis and comprises a core and a cladding surrounding the core, and wherein the multimode optical fiber is a graded-index optical fiber, the refraction index profile in the fiber essentially following the formula:

$$n(r) = \begin{cases} n_1 \left[1 - 2\left(\frac{r}{a}\right)^g \Delta\right]^{1/2}, & r < a \\ n_2, & r > a \end{cases}$$

where $$\Delta = \frac{n_1^2 - n_2^2}{2n_1^2},$$

where:
r is a distance from the fiber axis,
n(r) is a nominal refractive index as a function of distance from the fiber axis,
$n_1$ is a nominal refractive index on the axis of said optical fiber,
$n_2$ is a refractive index of the cladding,
a is a core radius, and
g is a parameter that defines a shape of the profile and is between 1.2 and 1.8; and obtaining an output power of at least 30 dBm after a length of at least 500 m.

8. The method according to claim 7, wherein said wavelength of the inputted electromagnetic radiation is between 800 nm and 900 nm.

9. The method according to claim 7, comprising inputting electromagnetic radiation having an input optical power equal to or greater than 2 W.

10. The method according to claim 7, wherein said core has a diameter between 90 µm and 190 µm.

11. The method according to claim 10, wherein said core has a diameter between 95 µm and 110 µm.

12. The method according to claim 7, wherein said optical fiber has a numerical aperture between 0.2 and 0.3.

13. The method according to claim 7, comprising:
outputting from said multimode optical fiber at a length of at least 1000 meters an electromagnetic radiation having an optical power of at least 25 dBm.

14. The method according to claim 13, comprising:
outputting from said multimode optical fiber at a length of at least 1000 meters an electromagnetic radiation having an optical power of at least 30 dBm.

15. The method according to claim 7, wherein inputting said electromagnetic radiation comprises inputting an electromagnetic radiation having an optical power below an input threshold value.

16. The method according to claim 15, wherein said input threshold value of said input optical power is equal to:

$$P_{thr}(g) = 10\log\left[3.6\pi 10^{13} a^2 \left(\frac{A(g)}{V^{2/(g+2)}} + \frac{B(g)}{V^{3/2}} + \frac{C(g)}{V^6}\right)^2\right],$$

where $V = (2a\pi/\lambda)NA$, $$A(g) = \left\{\frac{2}{5}\left[1 + 4\left(\frac{2}{g}\right)^{5/6}\right]\right\}^{1/2},$$

$B(g) = e^{0.298/g} - 1 + 1.478(1 - e^{-0.077g})$, and $C(g) = 3.76 + \exp(4.19/g^{0.418})$.

17. A method of optimization of the refractive index profile of an optical fiber for maximizing the distance of transmission of electromagnetic radiation within a multimode optical fiber maintaining an optical power of said electromagnetic radiation travelling in said multimode optical fiber above a pre-set value of optical power, the multimode optical fiber defining a fiber axis and comprising a core surrounding a cladding, wherein the multimode optical fiber is a graded-index fiber refractive index profile essentially follows the following formula:

$$n(r) = \begin{cases} n_1 \left[1 - 2\left(\frac{r}{a}\right)^g \Delta\right]^{1/2}, & r < a \\ n_2, & r > a \end{cases}$$

where $$\Delta = \frac{n_1^2 - n_2^2}{2n_1^2},$$

where:
r is a distance from the fiber axis,
n(r) is a nominal refractive index as a function of distance from the fiber axis, $n_1$ is a nominal refractive index on the axis,
$n_2$ is a refractive index of the cladding,
a is a core radius, and
g is a parameter that defines a shape of a profile,
the method comprising:
selecting an electromagnetic radiation to be inputted in the multimode optical fiber having a wavelength between 750 nm and 1000 nm in said multimode optical fiber and having an input optical power above 1 W;
selecting said value of said pre-set optical power; and
selecting the parameter g between 1.2 and 1.8.

18. The method according to claim 17, further comprising:
selecting the numerical aperture of said fiber.

19. The method according to claim 18, further comprising:
selecting said numerical aperture between 0.2 and 0.3.

20. The method according to claim 17, wherein said selected parameter g is a value which maximizes an equation for a maximum distance L travelled by the electromagnetic radiation within the multimode fiber with an optical power above said pre-set optical power, said equation being:

$$L(km) = \frac{P_{in} - P_L}{\alpha(g)},$$

where
$P_L$ is the pre-set value of said optical power;
$P_{in}$ is the input power of the electromagnetic radiation;

$$\alpha(g) = \frac{C(g, p)}{\Delta}\left(\frac{a^2}{\Delta}\right);$$

where $$C(g, p) = \frac{d}{2}\frac{Z_1^2(v)}{D^2 p}\left(\frac{g+2}{4g}\right)^{1+p}\left(1 + \frac{[p(g-2)-2]}{g+2}\right)^2,$$

and p=2, $Z_1$ (v) is a first zero of a Bessel function of order v, and d, D are constants.

21. The method according to claim 20, wherein said input optical power $P_{in}$ is set below a threshold input optical power.

22. The method according to claim 21, wherein said threshold input optical power is calculated according to:

$$P_{thr}(g) = 10\log\left[3.6\pi 10^{13} a^2 \left(\frac{A(g)}{V^{2/(g+2)}} + \frac{B(g)}{V^{3/2}} + \frac{C(g)}{V^6}\right)^2\right],$$

where $V = (2a\pi/\lambda)NA,$ $A(g) = \left\{\frac{2}{5}\left[1 + 4\left(\frac{2}{g}\right)^{5/6}\right]\right\}^{1/2},$ $B(g) = e^{0.298/g} - 1 + 1.478(1 - e^{-0.077g}),$ and $C(g) = 3.76 + \exp(4.19/g^{0.418}).$ 23. The method according to claim 17, wherein said pre-set value of optical power is of from 25 dBm and 50 dBm.

24. The method according to claim 17, comprising manufacturing a multimode optical fiber having such g value.

25. An optical cable comprising a multimode optical fiber for continuous transmission of electromagnetic radiation at high power, said fiber defining a fiber axis, a core and a cladding surrounding the core, and wherein the multimode optical fiber is a multimode graded-index fiber, the refraction index profile in the fiber essentially follows the formula:

$$n(r) = \begin{cases} n_1\left[1 - 2\left(\frac{r}{a}\right)^g \Delta\right]^{1/2}, & r < a \\ n_2, & r > a \end{cases}$$

where $$\Delta = \frac{n_1^2 - n_2^2}{2n_1^2},$$

r is a distance from the fiber axis,
n(r) is a nominal refractive index as a function of distance from the fiber axis,
$n_1$ is a nominal refractive index on the axis of the fiber,
$n_2$ is a refractive index of the cladding,
a is a core radius, and
g is a parameter that defines a shape of the profile,
wherein:
a core diameter 2a is between 90 μm and 190 μm,
the parameter g is between 1.2 and 1.8, and
the numerical aperture (NA) of the fiber, where $NA = \sqrt{n_1^2 - n_2^2},$ is between 0.2 and 0.3.

* * * * *

UNITED STATES PATENT AND TRADEMARK OFFICE
CERTIFICATE OF CORRECTION

| | |
|---|---|
| PATENT NO. | : 10,197,725 B2 |
| APPLICATION NO. | : 15/524526 |
| DATED | : February 5, 2019 |
| INVENTOR(S) | : Vieira De Silva et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 75 days.

Signed and Sealed this
Ninth Day of June, 2020

Andrei Iancu
*Director of the United States Patent and Trademark Office*